(12) United States Patent
Qiu et al.

(10) Patent No.: US 8,724,204 B2
(45) Date of Patent: May 13, 2014

(54) SYSTEM AND METHOD FOR GENERATING AN OPTICAL COMB

(75) Inventors: Ying Qiu, Wuhan (CN); Zhixue He, Wuhan (CN); Ming Luo, Wuhan (CN); Xiaoyin Zhang, Wuhan (CN); Qi Yang, Wuhan (CN)

(73) Assignee: Wuhan Research Institute of Posts and Telecommunications, Wuhan, Hubei Province (CN)

( * ) Notice: Subject to any disclaimer, the term of this patent is extended or adjusted under 35 U.S.C. 154(b) by 166 days.

(21) Appl. No.: 13/340,410

(22) Filed: Dec. 29, 2011

(65) Prior Publication Data

US 2013/0050795 A1     Feb. 28, 2013

(30) Foreign Application Priority Data

Aug. 24, 2011 (CN) .......................... 2011 1 0243326

(51) Int. Cl.
*G02F 1/01* (2006.01)
*G02B 6/00* (2006.01)

(52) U.S. Cl.
USPC .......................................... 359/238; 385/122

(58) Field of Classification Search
USPC .................. 359/237, 238, 326–332; 385/122; 372/21, 22, 26, 28
See application file for complete search history.

(56) References Cited

U.S. PATENT DOCUMENTS

| | | | |
|---|---|---|---|
| 8,494,378 B2 * | 7/2013 | Takasaka et al. | ............. 398/201 |
| 2003/0174938 A1 | 9/2003 | Headley et al. | |

FOREIGN PATENT DOCUMENTS

CN       1707877       12/2005

OTHER PUBLICATIONS

Jianjun Yu, et al., "Generation, Transmission and Coherent Detection of 11.2Tb/s (112×100Gb/s) Single Source Optical OFDM Superchannel", OFC 2011, PDPA6, pp. 3.
K.R.Tamura, et al., "Fundamentals of Stable Continuum Generation at High Repetition Rates" (IEEE J. Quantum Electron., vol. 36, No. 7, pp. 773-779, Jul. 2000), pp. 7.
V.R. Supradeepa, et al., "A Broadband, Spectrally Flat, High Rep-rate Frequency Comb: Bandwidth Scaling and Flatness Enhancement of Phase Modulated CW through Cascaded Four-Wave Mixing" (OFC 2011, OMQ3), pp. 3.
G.A.Sefler et al., "Frequency Comb Generation by Four-Wave Mixing: The Role of Fiber Dispersion", CLEO'98, Technical Digest. Summaries of papers presented at the Conference 1998, CFA8, pp. 498-499), pp. 2.
V. Torres-Company, J. Lancis, and P. Andrés, "Unified Approach to Describe Optical Generation by Propagation of Periodically Phasemodulated CW Laser Light", Opt. Express, vol. 14, No. 8, pp. 3171-3180, Apr. 2006, pp. 10.
Hu Shanmel et al., "A Radio Over Fiber System with Frequency Sextuple Optical Millimeter-Wave Generation Carrying OFDM Signal Utilizing Phase Modulator", Acta Photonica Sinica, vol. 39, No. 4, pp. 699-703, Apr. 2010, pp. 5.

(Continued)

*Primary Examiner* — Tuyen Tra
(74) *Attorney, Agent, or Firm* — Dentons US LLP

(57) ABSTRACT

A system and method for generating an optical comb are provided. The system comprises at least one modulator for modulating a continuous wave sequentially by using at least one signal, respectively so as to generate a comb wave having a first plurality of subcarriers; and a nonlinear medium for causing the respective subcarriers of the comb wave to perform four-wave mixing to thereby generate a comb wave having a second plurality of subcarriers as the optical comb. With the present system and method, an ultra-wide spectrum optical comb with stable frequencies may be generated.

12 Claims, 3 Drawing Sheets

(56) References Cited

OTHER PUBLICATIONS

Kohei Mandai, et al., Whole C-Band, Repetition Rate Tunable Optical Pulse Generation Using a High-Resolution Arrayed-Waveguide Grating and an Optical Comb Generator, OFC 2004, OtuD4, pp. 3.

Chunning Hou, et al., "Dual-Level Optical Single Side Band Modulation Scheme for 0.1 Tera Hz Radio-Over-Fiber Systems", SPIE-OSA-IEEE, vol. 7632 76321W-1, pp. 6.

English Abstract of CN1707877, p. 1.

* cited by examiner

S601 modulating a continuous wave sequentially by using at least one signal, respectively, so as to generate a comb wave having a first plurality of subcarriers

S602 causing the respective subcarriers of the comb wave to perform four-wave mixing through a nonlinear medium, to thereby generate a comb wave (optical comb) having a second plurality of subcarriers

SYSTEM AND METHOD FOR GENERATING AN OPTICAL COMB

CROSS REFERENCE TO RELATED APPLICATIONS

This application is based upon and claims the benefit of priority from the prior Chinese Patent Application CN201110243326.3, filed in the State Intellectual Property Office of the P.R.C. on Aug. 24, 2011, the disclosure of which is hereby incorporated by reference in its entirety.

FIELD OF THE INVENTION

The invention relates generally to an optical communication field, and more particularly to a system and method for generating an optical comb.

DESCRIPTION OF RELATED ART

As the demand for network bandwidths rapidly increases, global Internet traffics jumped significantly. It necessitates the expansion of transmission backbone capacity in the optical communication field. Jianjun Yu group reported a single-channel rate of 11.2 Tbis/s, and realized a 640-km transmission in a single mode optical fiber, which produced a transmission experiment with the highest single-channel rate currently (see, for example, Jianjun Yu, et al, "Generation, Transmission and Coherent Detection of 11.2 Tb/s (112×100 Gb/s) Single Source Optical OFDM Superchannel," OFC 2011, PDPA6). An attempt to achieve an even higher rate for a single optical source is focusing on how to generate more subcarriers, such as how to obtain a wider super-continuum spectrum. There are many methods for generating the super-continuum spectrum. In 2000, K. R. Tamura's group of NTT reported in "Fundamentals of Stable Continuum Generation at High Repetition Rates" (IEEE J. Quantum Electron., Vol. 36, No. 7, pp. 773-779, July 2000) that a self-phase modulation (SPM) effect of an ultra-short pulse optical source in a nonlinear optical fiber is utilized to generate a super-continuum spectrum. A more common approach adopts a Recirculating Frequency Shifter (RFS) to generate multiple subcarriers where a bandpass filter or an acousto-optic frequency shifter is placed in an optical fiber loop, an EDFA is used to compensate for loop loss, and multiple stable subcarrier outputs are generated from a single-frequency light in the optical fiber loop. V.R.Supradeepa's group reported a new approach for generating a super-continuum spectrum in "A Broadband, Spectrally Flat, High Rep-rate Frequency Comb: Bandwidth Scaling and Flatness Enhancement of Phase Modulated CW through Cascaded Four-Wave Mixing" (OFC 2011, OMQ3). With this approach, two continuous waves pass through modulators, and generate comb waves with identical frequency intervals, respectively. The comb waves are then amplified by amplifiers to generate high-power laser lights. A four-wave mixing (FWM) combination of the two continuous waves is obtained by using the four-wave mixing effect of a nonlinear optical fiber such that a spectrum width of a second-order FWM is about 5 times a spectrum width of the continuous wave passing through the modulator. In 1998, Sefler's group realized frequency broadening of 2-3 Nm By Using An Electro-Optic Modulator To Perform Frequency shifting and utilizing a four-wave mixing effect of a dispersion-shifted fiber (see, for example, G. A. Sefler et al., "Frequency comb generation by four-wave mixing: the role of fiber dispersion", CLEO'98, Technical Digest. Summaries of papers presented at the Conference 1998, CFA8, pp. 498-499).

Each of the above techniques has its own advantages and disadvantages. For the first approach of utilizing the SPM effect of the ultra-short pulse optical source to broaden the spectrum, the ultra-short pulse optical source can be expensive and the broadened spectrum is somewhat limited. As for the second approach of utilizing the RFS to generate multiple subcarriers, EDFA amplifiers are used for many times in the optical fiber loop, noises are accumulated, and noise coefficients of generated frequency components increase gradually. In the third approach of using a single stage of modulator and where a dispersion-shifted fiber to broaden the spectrum is relatively complicated, the broadened spectrum may not be sufficiently wide, the modulator uses a bias voltage, and frequencies may not stable.

Therefore, there is a need for a system and method for generating an ultra-wide spectrum optical comb with stable frequencies in a simple manner.

SUMMARY OF THE INVENTION

The present invention provides a system and method for generating an ultra-wide spectrum optical comb with stable frequencies. In one embodiment of the invention, a system generates an optical comb comprising at least one modulator for modulating a continuous wave sequentially by using at least one signal, respectively, so as to generate a comb wave having a first plurality of subcarriers; and a nonlinear medium for causing the respective subcarriers of the comb wave to perform four-wave mixing to thereby generate a comb wave having a second plurality of subcarriers as the optical comb.

In another embodiment of the invention, a method is configured to generate an optical comb, comprising modulating a continuous wave sequentially by using at least one signal, respectively, so as to generate a comb wave having a first plurality of subcarriers; and causing the respective subcarriers of the comb wave to perform four-wave mixing by using a nonlinear medium to thereby generate a comb wave having a second plurality of subcarriers as the optical comb.

The system and method according to the above aspects of the invention may generate an ultra-wide spectrum optical comb with stable frequencies in a simple manner.

BRIEF DESCRIPTION OF THE DRAWINGS

The above and other objects, features and advantages of the present invention will become apparent from the detailed description of embodiments of the present invention in conjunction with the attached drawings.

DETAILED DESCRIPTION

Figure 1:
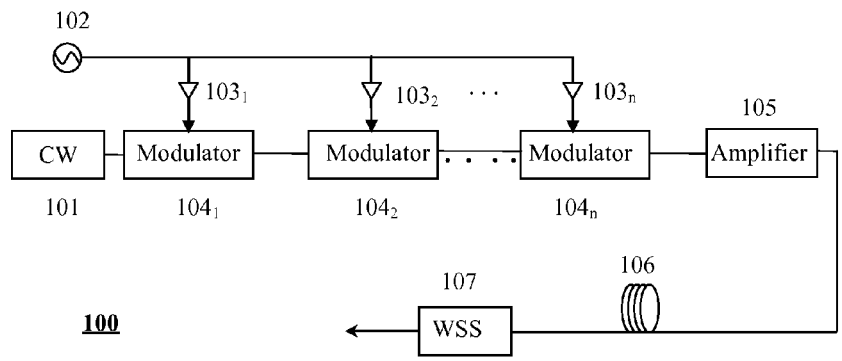
FIG. 1 is a block diagram showing a system for generating an optical comb according to an embodiment of the invention.

A system and method for generating an optical comb according to an embodiment of the invention are described below.

In one embodiment, a light beam outputted by a continuous wave (CW) laser is inputted into a group of modulators. The respective modulators in the group of modulators are driven by a radio frequency signal, which is generated by a radio frequency signal generator and is preferably amplified by a group of radio frequency power amplifiers respectively, i.e., modulating the inputted continuous wave (also referred to as "continuous light") sequentially by using the radio frequency signal, and thereby obtain a comb wave with shifted frequencies (having multiple frequency components). The comb wave is power-amplified by an optical amplifier, and is then inputted into a high nonlinear optical fiber to perform four-wave mixing such that an optical comb having more frequency components is generated. Subsequently, a wavelength selective switch (WSS) is used to adjust the optical comb.

The modulators may be implemented as sine wave phase modulators. In such instance, the continuous wave is modulated by the sine wave phase modulators, and a comb wave with a repetition frequency identical to a modulation frequency (i.e., a frequency of the radio frequency signal) is obtained (i.e., sidebands are generated). The above modulator group may include one, two or more modulators. The respective modulators are driven by the same signal generator, and driving frequencies (or modulation frequencies) are about or completely the same as to ensure that frequency intervals of sidebands generated after the continuous wave is modulated for many times are about or completely the same. The number of frequency components (i.e., the number of subcarriers) of the comb wave obtained by the modulation performed by the modulator group is limited, and a covered spectrum width is small. For example, if the frequency of the signal generator (i.e., the frequency of the radio frequency signal) is 10 GHz, and a comb wave includes 20 frequency components is generated after the continuous wave passes through two modulators, a total frequency bandwidth of the comb wave is 200 GHz, which corresponds to that a light beam with a center wavelength of 1550 nm is broadened by 1.6 nm. To obtain an optical comb having a greater spectrum width, an optical amplifier, which may be a semiconductor optical amplifier (SOA), an Erbium doped fiber amplifier (EDFA), a Raman fiber amplifier (RFA), a fiber optical parametric amplifier (FOPA) or the like, is used to amplify the comb wave outputted from the modulator group as described above, so that powers of the respective frequency components thereof are amplified, then the amplified comb wave is inputted to the high nonlinear optical fiber. A zero-dispersion wavelength of the nonlinear optical fiber is near or equal to a center wavelength of the laser so that four-wave mixing occurs among the respective frequency components of the comb wave, and thereby a comb-like having more frequency components with identical intervals is obtained. By adjusting the modulator group and the optical amplifier properly to make them satisfy a condition, the broadened spectrum may cover a spectrum width of over 30 nm in the whole C band.

The system and method for generating an optical comb according to the embodiment of the invention is described below with reference to figures.

FIG. 1 shows a block diagram showing the system for generating an optical comb according to one embodiment of the invention. The system may generate a stable ultra-wide spectrum optical comb by adopting a combination of concatenation of modulators and a high nonlinear optical fiber.

As shown in FIG. 1, the system 100 comprises a continuous wave (CW) laser 101, a radio frequency signal generator 102, a group of (at least one) radio frequency power amplifiers $103_1, 103_2, \ldots, 103_n$ ($n \geq 1$), a group of (at least one) modulators $104_1, 104_2, \ldots, 104_n$, an amplifier 105, a nonlinear optical fiber 106, and a wavelength selective switch (WSS) 107.

The at least one modulators $104_1, 104_2, \ldots, 104_n$ modulate a light beam outputted by the CW laser 101. The modulators $104_1, 104_2, \ldots, 104_n$ are driven by a signal sent by the radio frequency signal generator 102 and preferably amplified by the radio frequency power amplifiers $103_1, 103_2, \ldots, 103_n$. After the continuous wave is modulated, a comb wave with shifted frequencies is obtained. The comb wave is preferably power-amplified by the optical amplifier 105, and then is inputted to the high nonlinear optical fiber 106 to perform four-wave mixing, thereby obtaining an optical comb having more frequency components. The optical comb is adjusted by the WSS 107.

The CW laser 101 is a laser commonly known in the art. It generates a continuous wave (also referred to as "continuous light or continuous laser light"), and outputs the light beam to the modulators $104_1, 104_2, \ldots, 104_n$ (specifically, a first modulator $104_1$ in the group of modulators).

The radio frequency signal generator 102 generates a radio frequency signal and outputs it to the radio frequency power amplifiers $103_1, 103_2, \ldots, 103_n$.

The radio frequency power amplifiers $103_1, 103_2, \ldots, 103_n$ are connected to the radio frequency signal generator 102. They amplify the radio frequency signal respectively to improve its signal power, and outputs the amplified radio frequency signal to corresponding modulators $104_1, 104_2, \ldots, 104_n$, as shown in FIG. 1, The respective amplifiers may have the same or different gains. In instances where the radio frequency signal generated by the radio frequency signal generator 102 has a high power, the radio frequency power amplifiers $103_1, 103_2, \ldots, 103_n$ may be omitted.

The at least one modulators $104_1, 104_2, \ldots, 104_n$ modulate the continuous wave sequentially by using the radio frequency signal, respectively, so as to generate a comb wave (or called optical comb) having a first plurality of subcarriers.

Specifically, as shown in FIG. 1, the modulators $104_1, 104_2, \ldots, 104_n$ are concatenated together. The first modulator $104_1$ modulates the (amplified) continuous wave by using the radio frequency signal, and generates a first comb wave having a plurality of subcarriers (frequency components). The second modulator $104_2$ receives the first comb wave, and modulates the first comb wave by using the radio frequency signal to thereby generate a second comb wave having more subcarriers. Similarly, each of the modulators $104_3, 104_4, \ldots, 104_n$ receives a comb wave outputted from a previous stage of modulator, modulates the comb wave by using the radio frequency signal, and thereby generates a comb wave having more subcarriers. A comb wave having many subcarriers is outputted from the modulator $104_n$.

Hereinafter, the principle of modulating the continuous wave by the first modulator $104_1$ is described.

The first modulator $104_1$ may be a phase modulator, a modulation function thereof is V(t), and a half-wave voltage thereof is $V_\pi$. The continuous wave can be expressed as $E_0(t) = E_0 \exp(-j\omega_0 t)$, where $E_0$ is an amplitude of the continuous wave and is a constant, and $W_0$ is an angular frequency of the continuous wave. The modulated light generated by the modulation of the first modulator may be expressed as:

$$E(t) = E_0 \exp(-j\omega_0 t) \exp(j\omega V(t)/V_\pi) \tag{1}$$

Figure 2:
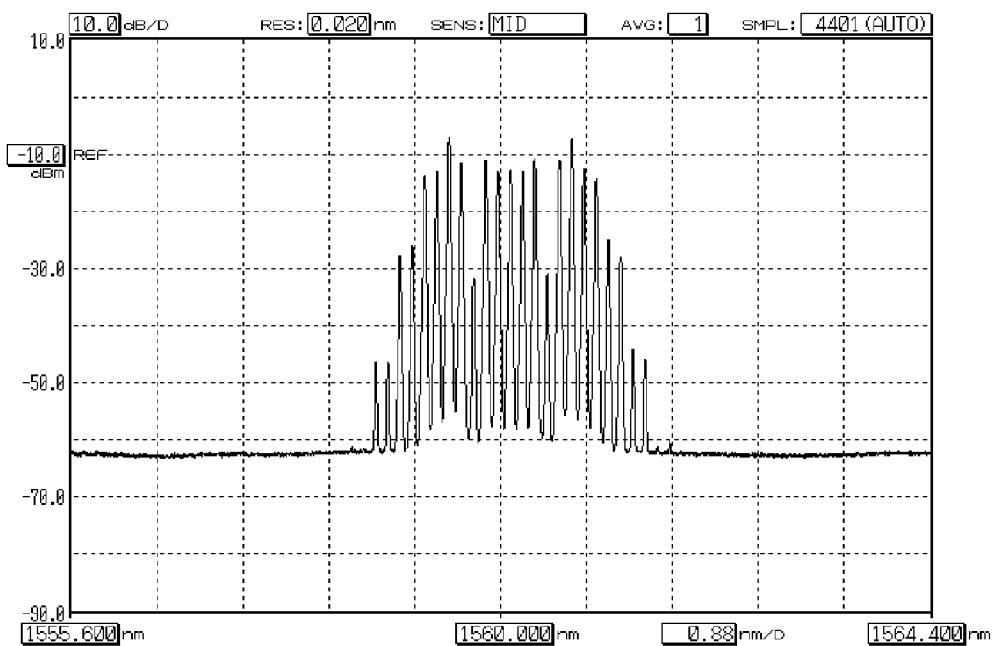
FIG. 2 is an experimental graph showing an optical spectrum of a comb wave (or "optical comb") generated after a continuous wave is modulated by one modulator.

When the inputted radio frequency signal V(t) is a single-frequency signal, assume the frequency of the signal is $\omega$, then by expanding $\exp(j\pi V(t)/V_\pi)$, a plurality of frequency components ($\ldots, \omega_0 - 2\omega, \omega_0 - \omega, \omega_0 + \omega, \omega_0 + 2\omega \ldots$) with a center frequency of $\omega_0$ are generated at equal intervals. The number of the frequency components mainly depends on an amplitude of V(t), i.e., the power of the inputted single-frequency signal, and is in direct proportion to the power of the inputted signal. In this way, a frequency shift is realized. These frequency components form a comb wave, and the respective frequency components of the comb wave are spaced at equal frequency intervals of ω. A plurality of frequency sidebands including more frequency components may be generated by performing a strong sine phase modulation on the continuous wave (for example, by increasing the power of the radio frequency signal used to modulate the continuous wave) (see V. Torres-Company, J. Lancis, and P. Andres, "Unified approach to describe optical pulse generation by propagation of periodically phase modulated CW laser light", Opt. Express, Vol. 14, No. 8, pp. 3171-3180, April 200; Hu Shanmei, Chen Lin, "A radio over fiber system with frequency sextuple optical millimeter-wave generation carrying OFDM signal utilizing phase modulator", Acta Photonica Sinica, Vol. 39, No. 4, pp. 699-703, April 2010). Therefore, the number of frequency components (subcarriers) included in the comb wave may be controlled by changing the power of the radio frequency signal. For example, the number of subcarriers may be increased by improving the power of the radio frequency signal. FIG. 2 shows an experimental graph of an optical spectrum of a comb wave generated after a continuous wave with a center wavelength of 1560 nm is modulated by one modulator. It can be seen that a comb wave having a plurality of frequency components is generated from the continuous wave having a single wavelength by one stage of phase modulation.

Figure 3:
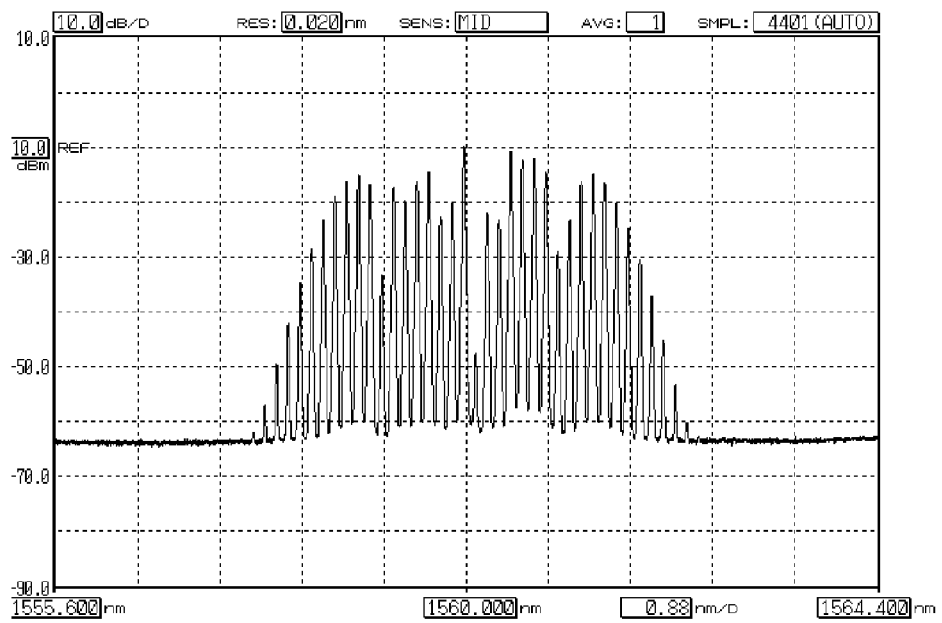
FIG. 3 is an experimental graph showing an optical spectrum of a comb wave (optical comb) generated after a continuous wave is modulated by two modulators.

The second modulator $104_2$ receives the comb wave outputted from the first modulator $104_1$, and modulates the comb wave by using the radio frequency signal. Each subcarrier in the comb wave is modulated such that a comb wave having more frequency components is generated. That is, more new frequency sidebands may be obtained by concatenating a phase modulator to the first stage of modulator. FIG. 3 shows an experimental graph of an optical spectrum of a new comb wave generated after the continuous wave is modulated by two stages of phase modulators. It can be seen that the comb wave obtained through the two stages of phase modulations have more frequency components.

The comb wave generated by the second modulator is outputted to subsequent modulators for further modulation. Thereby, a comb wave (optical comb) having a plurality of subcarriers is generated by sequential modulation of the modulators $104_1, 104_2, \ldots, 104_n$, and the number of subcarriers included in the comb wave generated by each stage of modulation is larger than that generated by the previous stage of modulation. Moreover, as the respective modulators are driven by the signals having the same frequency (ω), i.e., the continuous wave is modulated by using the signals having the same frequency, the respective frequency components (subcarriers) of the finally generated comb wave are spaced at equal frequency intervals (equal to ω).

It is to be appreciated that, besides the phase modulator, an intensity modulator may be used to modulate the continuous wave. The intensity modulator may shape the generated optical comb (see, for example, Kohei Mandai, et al, Whole C-band, repetition rate tunable optical pulse generation using a high-resolution arrayed-waveguide grating and an optical comb generator, OFC 2004, OtuD4). It is also possible to concatenate a plurality of phase modulators and intensity modulators to obtain a flat comb wave having a plurality of frequency components.

The amplifier 105 amplifies the comb wave having a plurality of frequency components generated by the modulator $104_n$ to increase its signal power to ensure an efficiency of four-wave mixing that occurs subsequently in the nonlinear optical fiber 106. The amplifier 105 may be SOA, EDFA, RFA, FOPA or other type of optical amplifier. In instances where the comb wave has a high power, the amplifier 105 may be omitted.

The amplified comb wave is inputted to the nonlinear optical fiber 106, which is preferably a high nonlinear optical fiber. In the nonlinear optical fiber 106, the respective frequency components (subcarriers) of the comb wave perform four-wave mixing, thereby a comb wave (optical comb) having more frequency components is generated. As the respective frequency components of the comb wave entering the nonlinear optical fiber 106 are spaced at equal frequency intervals ω, the respective frequency components of the optical comb generated by the four-wave mixing are also spaced at equal frequency intervals ω.

Figure 4:
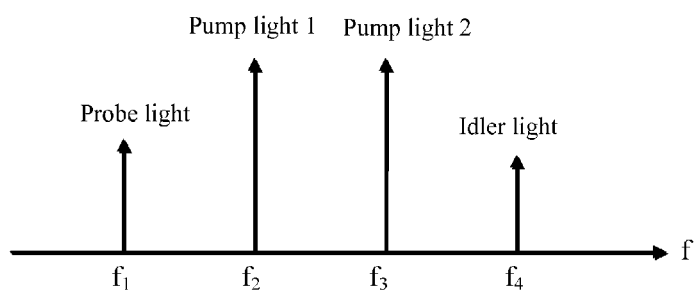
FIG. 4 is a schematic diagram illustrating the dual-pump four-wave mixing principle.

The principle of a four-wave mixing is described with reference to FIG. 4. As shown in FIG. 4, in the four-wave mixing, three lights having different wavelengths (or frequencies), i.e., a probe light, a pump light 1 and a pump light 2, interact with each other, and generate a fourth light, i.e., an idler light. Assuming a frequency of the probe light is $f_1$, and frequencies of the two pump lights are $f_2$ and $f_3$, respectively, the idler light having a frequency of $f_4=f_2+f_3-f_1$ may be generated. Therefore, when the frequency intervals of the lights (subcarriers) participating in the four-wave mixing are w, the frequency intervals between two adjacent frequency components in the respective frequency components of the light generated by the four-wave mixing are also ω.

In one embodiment, the occurrence of the four-wave mixing requires a strict phase match. When the respective frequency components are near a zero-dispersion frequency of the nonlinear optical fiber, the influence of material dispersion on phase mismatch may be relatively small, while a phase match condition may be satisfied. In instances of a degenerate four-wave mixing (i.e., the frequencies of the two pump lights are the same), the phase match condition can be expressed as follows:

$$\Delta\beta = \beta_{probe} + \beta_{idler} - 2\beta_{pump} = -\frac{8\pi f_p^2}{c} D(f_p)(f_{probe} - f_p) \quad (2)$$

where the symbol $\Delta\beta$ denotes a phase mismatch amount, the symbols $\beta_{probe}, \Delta_{idler}, \beta_{pump}$ denote transmission constants of the probe light, the idler light and the pump lights, respectively, the symbols $f_p, f_{probe}$ denote frequencies of the pump lights and the probe light, respectively, and the symbol $D(f_p)$ denotes a dispersion value of the pump lights. When $\Delta\beta$ is equal to zero, a complete phase match is achieved. Practically, the more $\Delta\beta$ approaches zero, the higher the efficiency of the four-wave mixing is, and the better the effect thereof is. This requires that $D(f_p)$ is close to or at zero, i.e., the four-wave mixing occurs at a zero-dispersion wavelength point of the high nonlinear optical fiber. At the same time, it is preferable that a dispersion slope of the high nonlinear optical fiber is as small as possible so that a dispersion curve is as flat as possible to thereby obtain a wider super continuum spectrum. Therefore, in one embodiment of the invention, a zero-dispersion wavelength of the nonlinear optical fiber 106 is preferably near or the same as a center wavelength of the continuous wave generated by the CW laser 101 to ensure the efficiency of the four-wave mixing.

Figures 5, 6:
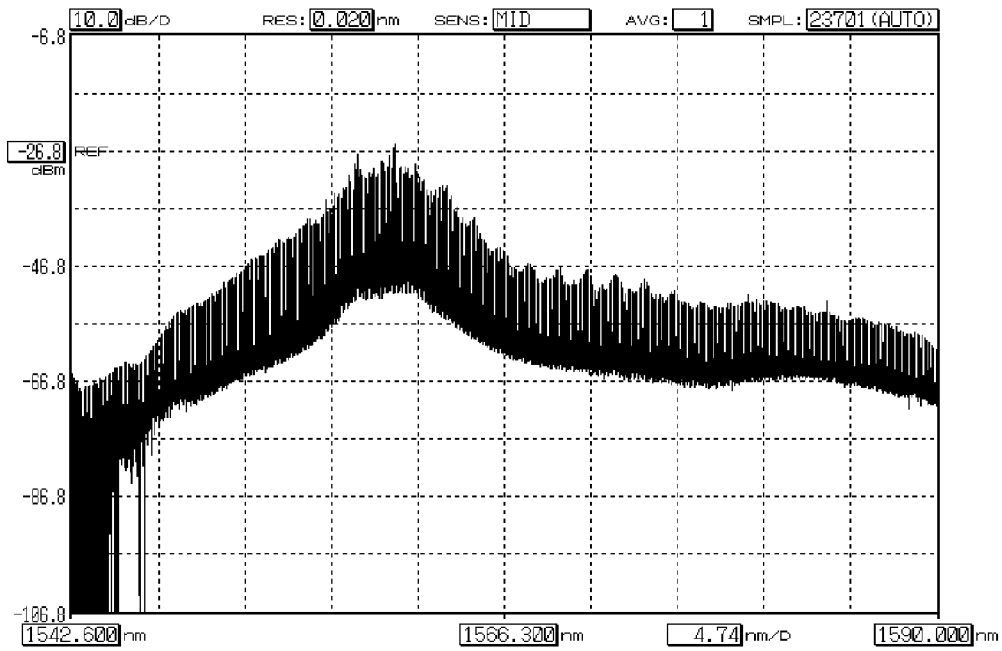
FIG. 5 is an experimental graph showing a super-continuum spectrum of an unshaped optical comb generated according to an embodiment of the invention.
FIG. 6 is a flow diagram showing a method for generating an optical comb according to an embodiment of the invention.

In the nonlinear optical fiber 106, the four-wave mixing occurs among the respective subcarriers of the comb wave, thereby a comb wave (optical comb) having more subcarriers is generated. FIG. 5 shows an experimental graph showing an optical spectrum of an optical comb obtained when the optical comb shown in FIG. 3 is amplified to a power of 1 W by an EDFA amplifier and then enters a high nonlinear optical fiber having a zero-dispersion wavelength of 1557 nm to perform the four-wave mixing. It can be seen that a super continuum spectrum having more subcarriers is obtained, and a wavelength span thereof is over 30 nm.

The wavelength selective switch (WSS) 107 may shape the optical comb outputted from the nonlinear optical fiber 106, and obtains a comb wave in which respective subcarriers have powers equal to each other. Specifically, WSS 107 may apply different attenuations to different subcarriers so that the respective attenuated subcarriers have equal powers.

Thus, the continuous wave is modulated to generate a comb wave having a plurality of subcarriers, and then the four-wave mixing occurs among the respective subcarriers of the comb wave so that an optical comb having more subcarriers is generated.

The system for generating an optical comb as described above is intended as exemplary, and those skilled in the art may make various changes thereto without departing from the scope of the invention. For example, although in the above the respective modulators modulate the continuous wave by using a radio frequency signal(s) having the same frequency, this is not limitative, and the respective modulators may modulate the continuous wave by using radio frequency signals with the same or different frequencies, where the frequencies of the respective radio frequency signals are integral multiples of a basic frequency. In such case, frequency intervals between two adjacent subcarriers in the respective subcarriers of the generated optical comb may be the greatest common divisor of the frequencies of the respective radio frequency signals. Additionally, the use of the nonlinear optical fiber is not limitative, and other types of nonlinear medium, such as any crystal with a high nonlinear coefficient, may be used in place of the nonlinear optical fiber 106.

Hereinafter, a method for generating an optical comb according to an embodiment of the invention is described with reference to FIG. 6. This method may be performed by the system shown in FIG. 1.

In step S601, a continuous wave (continuous light) is modulated sequentially by using at least one signal, respectively so as to generate a comb wave having a first plurality of subcarriers. The continuous wave may be a continuous laser light generated by a CW laser.

The sequential modulation may be performed by at least one concatenated modulators, as shown in FIG. 1. As described above, the at least one signal may be radio frequency signals having the same frequency. In such case, respective subcarriers of the comb wave generated by the modulation are spaced at equal frequency intervals (equal to the frequency of the radio frequency signals). Alternatively, the at least one signal may be radio frequency signals having frequencies which are integral multiples of a basic frequency and which may be the same or different. In such case, frequency intervals between two adjacent subcarriers in the respective subcarriers of the comb wave generated by the modulation may be the greatest common divisor of the frequencies of the respective radio frequency signals. The respective radio frequency signals may be generated by a radio frequency signal amplifier(s), and are preferably amplified by amplifiers respectively to increase their powers and thus increase the number of subcarriers in the comb wave.

In step S602, the respective subcarriers of the comb wave perform four-wave mixing through a nonlinear medium, to thereby generate a comb wave (optical comb) having more subcarriers.

The nonlinear medium may be a nonlinear optical fiber, and is preferably a high nonlinear optical fiber. In such case, the comb wave generated in step S601 is inputted to the nonlinear optical fiber so that the respective subcarriers of the comb wave perform the four-wave mixing in the nonlinear optical fiber. In order to ensure an efficiency of the four-wave mixing, the comb wave generated in step S601 is preferably amplified to increase its power, then the amplified comb wave is inputted to the nonlinear optical fiber to perform the four-wave mixing. Additionally, to further improve the efficiency of the four-wave mixing, it is preferable that a center wavelength of the continuous wave is located at or near a zero-dispersion wavelength of the nonlinear optical fiber. Besides the nonlinear optical fiber, the nonlinear medium may also be other types of nonlinear medium, such as a crystal having a high nonlinear coefficient.

With the system and method for generating an optical comb according to the embodiment of the invention, an optical comb having many subcarriers may be generated from a continuous wave produced by a CW laser. By means of various measures, such as increasing the number of the concatenated modulators, increasing the powers of the radio frequency signals used to modulate the continuous wave, or improving the gain of the amplifier 105, an ultra-wide spectrum optical comb with stable frequencies may be generated.

Compared with a conventional art, the embodiment of the invention has the following advantages: First, the generated continuum spectrum has a wide spectrum width. Second, the frequency of the radio frequency signal generator is stable and controllable. Frequency intervals of subcarriers of the comb wave generated by modulation of multiple stages of modulators are stable. Positions of new frequencies generated by the four-wave mixing are decided by and equal to previous frequency intervals. After the four-wave mixing in the high nonlinear optical fiber, frequencies of the respective subcarriers of the generated optical comb are stable and have equal intervals. Third, a system that is offered at a lower cost, as compared with the expensive ultra-short pulse laser, e.g., the modulators and the high nonlinear optical fiber in the system have been in mass production which is priced less expensively. Fourth, the present invention yields uniform noise coefficients. In the method of using a RFS to generate multiple subcarriers, EDFA amplified are used for many times in the fiber loop, rendering that noises are accumulated and noise coefficients of the generated frequency components increase gradually, whereas the invention avoids this problem.

To deal with powers of a small amount of frequency components that may not stable, the power stability may be addressed by temperature control or other measures.

Although the exemplary embodiments of the present invention have been shown and described, it is to be understood by those skilled in the art that various changes in form and details can be made to these exemplary embodiments without departing from the scope and spirit of the present invention as defined in the claims and equivalents thereof

What is claimed is:

1. A system for generating an optical comb, comprising:
   at least one modulator configured to modulating a continuous wave sequentially by using at least one signal, respectively, so as to generate a comb wave having a first plurality of subcarriers; and a nonlinear medium configured to cause the respective subcarriers of the comb wave to perform four-wave mixing, thereby generating the comb wave having a second plurality of subcarriers as the optical comb, the nonlinear medium being a nonlinear optical fiber, and a center wavelength of the continuous wave being located at or near a zero-dispersion wavelength of the nonlinear optical fiber.

2. The system according to claim 1, wherein the continuous wave is a continuous laser light generated by a continuous wave laser.

3. The system according to claim 1, wherein the at least one signal has the same frequency.

4. The system according to claim 3, wherein the first plurality of subcarriers are spaced at equal frequency intervals, the frequency intervals being the frequency of the at least one signal.

5. The system according to claim 1, wherein the at least one signal has a frequency which is an integral multiple of a basic frequency.

6. The system according to claim 1, further comprising an amplifier for amplifying the comb wave having the first plurality of subcarriers.

7. A method for generating an optical comb, comprising:
modulating a continuous wave sequentially by using at least one signal, respectively, to generate a comb wave having a first plurality of subcarriers; and
causing the respective subcarriers of the comb wave to perform four-wave mixing through a nonlinear medium, thereby generating a comb wave having a second plurality of subcarriers as the optical comb, the nonlinear medium being a nonlinear optical fiber, and a center wavelength of the continuous wave being located at or near a zero-dispersion wavelength of the nonlinear optical fiber.

8. The method according to claim 7, wherein the continuous wave is a continuous laser light generated by a continuous wave laser.

9. The method according to claim 7, wherein the at least one signal has the same frequency.

10. The method according to claim 9, wherein the first plurality of subcarriers are spaced at equal frequency intervals, the frequency intervals being the frequency of the at least one signal.

11. The method according to claim 7, wherein the at least one signal has a frequency which is an integral multiple of a basic frequency.

12. The method according to claim 7, further comprising the step of amplifying the comb wave having the first plurality of subcarriers.

* * * * *